United States Patent
Joo et al.

(10) Patent No.: US 11,009,691 B2
(45) Date of Patent: May 18, 2021

(54) MICROSCOPE APPARATUS AND METHOD FOR CORRECTING POSITION OF LIGHT SOURCE

(71) Applicants: INDUSTRY-ACADEMIC COOPERATION FOUNDATION, YONSEI UNIVERSITY, Seoul (KR); SMALL MACHINES, Daejeon (KR)

(72) Inventors: Chul Min Joo, Goyang-si (KR); Seung Ri Song, Seoul (KR); Sunwoong Hur, Gwangju-si (KR); Jun Kyu Choi, Seoul (KR); Chang Hyuk Yoo, Seoul (KR)

(73) Assignees: Industry-Academic Cooperation Foundation, Yonsei University, Seoul (KR); Small Machines, Daejeon (KR)

( * ) Notice: Subject to any disclaimer, the term of this patent is extended or adjusted under 35 U.S.C. 154(b) by 0 days.

(21) Appl. No.: 16/866,925

(22) Filed: May 5, 2020

(65) Prior Publication Data

US 2020/0355899 A1 Nov. 12, 2020

(30) Foreign Application Priority Data

May 7, 2019 (KR) .......................... 10-2019-0052841

(51) Int. Cl.
*G02B 21/06* (2006.01)
*G06T 7/70* (2017.01)
(Continued)

(52) U.S. Cl.
CPC ........... *G02B 21/06* (2013.01); *G02B 21/025* (2013.01); *G02B 21/365* (2013.01);
(Continued)

(58) Field of Classification Search
CPC .... G02B 21/06; G02B 21/025; G02B 21/365; G06T 7/70; G06T 7/0002;
(Continued)

(56) References Cited

U.S. PATENT DOCUMENTS

| 2014/0288693 A1* | 9/2014 | Summerfield | ............ | G06T 7/74 700/166 |
| 2015/0043049 A1* | 2/2015 | Takahashi | .............. | G02B 21/14 359/238 |
| 2017/0122860 A1* | 5/2017 | Tatarkiewicz | ..... | G01N 15/1463 |

FOREIGN PATENT DOCUMENTS

| KR | 10-2008-0060656 A | 7/2008 |
| KR | 10-2011-0086222 A | 7/2011 |

(Continued)

OTHER PUBLICATIONS

Korean Office Action dated Aug. 29, 2019.

*Primary Examiner* — Allen C Wong
(74) *Attorney, Agent, or Firm* — Harness, Dickey & Pierce, P.L.C.

(57) ABSTRACT

Provided are a microscope apparatus and a method for correcting a position of a light source according to an exemplary embodiment of the present disclosure. The microscope apparatus for correcting the position of the light source according to the exemplary embodiment of the present disclosure includes: a light source unit which includes a light emitting element array including multiple light emitting elements and is configured to emit light to a subject; an optical unit which is disposed in parallel with the subject and configured to form an enlarged image of the subject to which the light is emitted; an image sensor which is configured to acquire the enlarged image of the subject by capturing the enlarged image formed by the optical unit; and a processor which is operably connected to the light source unit, the optical unit, and the image sensor and corrects a (Continued)

position of the light source unit based on the image acquired by the image sensor.

20 Claims, 10 Drawing Sheets

(51) Int. Cl.
*G02B 21/02* (2006.01)
*G02B 21/36* (2006.01)
*G06T 7/00* (2017.01)
*H04N 5/235* (2006.01)

(52) U.S. Cl.
CPC .............. *G06T 7/0002* (2013.01); *G06T 7/70* (2017.01); *H04N 5/2351* (2013.01); *H04N 5/2354* (2013.01); *G06T 2207/10056* (2013.01); *G06T 2207/20072* (2013.01)

(58) Field of Classification Search
CPC ........... G06T 2207/10056; G06T 2207/20072; H04N 5/2351; H04N 5/2354
USPC .......................................................... 348/79
See application file for complete search history.

(56) References Cited

FOREIGN PATENT DOCUMENTS

| KR | 10-2015-0144877 A | 12/2015 |
| KR | 10-1637552 B1 | 7/2016 |
| KR | 10-2018-0030163 A | 3/2018 |
| KR | 10-1859197 B1 | 5/2018 |
| KR | 20-2018-0057291 A | 5/2018 |

\* cited by examiner (a)

(b)

MICROSCOPE APPARATUS AND METHOD FOR CORRECTING POSITION OF LIGHT SOURCE

CROSS-REFERENCE TO RELATED APPLICATIONS

This application claims the priority of Korean Patent Application No. 10-2019-0052841 filed on May 7, 2019, in the Korean Intellectual Property Office, the disclosure of which is incorporated herein by reference.

BACKGROUND

Field

The present disclosure relates to a microscope apparatus and a method for correcting a position of a light source.

Description of the Related Art

A microscope apparatus forms an enlarged image by emitting light to a subject such as a sample by means of a light source and by allowing light reflected from the subject to pass through a lens, and acquires the enlarged image of the subject by capturing the formed image by means of an image sensor.

The acquired enlarged image needs to be high quality and/or resolution so that the enlarged image acquired by the microscope apparatus is accurately analyzed.

However, a position of a light source included in the microscope apparatus may be shifted while a user manipulates the microscope apparatus or the user transports the microscope apparatus. If the light source of which the position is shifted is used, the microscope apparatus may acquire an enlarged image having noise caused by a position error of the light source.

Therefore, there is a need for a method of minimizing image noise caused by a shift of a position of the light source in the microscope apparatus.

SUMMARY

An object of the present disclosure is to provide a microscope apparatus and a method for correcting a position of a light source.

Specifically, another object of the present disclosure is to provide a microscope apparatus and a method for correcting a position of a light source to minimize image noise caused by a position error of a light source.

Technical problems of the present disclosure are not limited to the aforementioned technical problems, and other technical problems, which are not mentioned above, may be clearly understood by those skilled in the art from the following descriptions.

To solve the above-mentioned problem, a microscope apparatus and a method for correcting a position of a light source according to an exemplary embodiment of the present disclosure are provided. A microscope apparatus for correcting a position of a light source according to an exemplary embodiment of the present disclosure includes: a light source unit which includes a light emitting element array including multiple light emitting elements and is configured to emit light to a subject; an optical unit which is disposed in parallel with the subject and configured to form an enlarged image of the subject to which the light is emitted; an image sensor which is configured to acquire the enlarged image of the subject by capturing the enlarged image formed by the optical unit; and a processor which is operably connected to the light source unit, the optical unit, and the image sensor and corrects a position of the light source unit based on the image acquired by the image sensor, in which the processor is configured to allow at least one of a first light emitting element and a second light emitting element, which is symmetrical to the first light emitting element about one axis, among the multiple light emitting elements, to simultaneously or sequentially emit multiple lights to the subject while moving the light source unit in one direction, form, by means of the optical unit, the enlarged image of the subject to which the multiple lights are emitted, acquire multiple images of the subject in accordance with a change in position of the optical unit by capturing the formed enlarged images by means of the image sensor, calculate a light intensity sum in respect to the acquired multiple images, check for a position error of the light source unit based on the calculated light intensity sum, and correct a position of the light source unit based on the checked position error.

A method of correcting a position of a light source in a microscope apparatus, which is performed by a processor of the microscope apparatus, according to an exemplary embodiment of the present disclosure includes: simultaneously or sequentially emitting multiple lights to a subject by means of at least one of a first light emitting element and a second light emitting element, which is symmetrical to the first light emitting element about one axis, among multiple light emitting elements, while moving, in one direction, a light source unit which includes a light emitting element array including the multiple light emitting elements and is configured to emit light to the subject; forming, by means of an optical unit disposed in parallel with the subject, an enlarged image of the subject to which the multiple lights are emitted; acquiring multiple images of the subject in accordance with a change in position of the optical unit by capturing the formed enlarged image by means of an image sensor; calculating a light intensity sum in respect to the respective acquired multiple images; checking for a position error of the light source unit based on the calculated light intensity sum; and correcting a position of the light source unit based on the checked position error.

Other detailed matters of the exemplary embodiment are included in the detailed description and the drawings.

According to the present disclosure, it is possible to acquire a high-quality and/or high-resolution enlarged image of a subject by minimizing image noise caused by a position error of the light source by checking for a position error of the light source and correcting the checked position error prior to acquiring the enlarged image of the subject.

The effects according to the present disclosure are not limited to the above-mentioned effects, and more various effects are included in the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
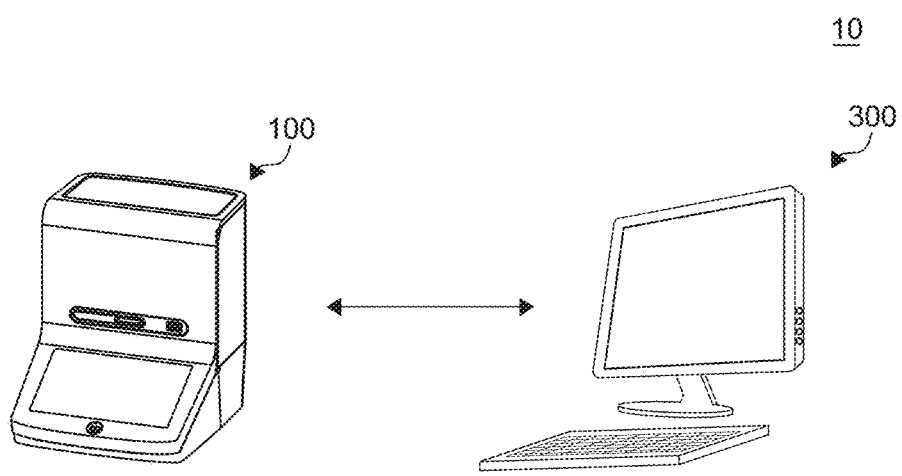
FIG. 1 is a configuration view of a microscope system according to an exemplary embodiment of the present disclosure.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments are provided so that the present disclosure is completely disclosed, and a person with ordinary skill in the art can fully understand the scope of the present disclosure. The present disclosure will be defined only by the scope of the appended claims.

Terms "first", "second", and the like may be used to describe various constituent elements, but the constituent elements are of course not limited by these terms. These terms are merely used to distinguish one constituent element from another constituent element. Therefore, the first constituent element mentioned hereinafter may of course be the second constituent element within the technical spirit of the present disclosure.

Throughout the specification, the same reference numerals denote the same constituent elements.

Respective features of several exemplary embodiments of the present disclosure may be partially or entirely coupled to or combined with each other, and as sufficiently appreciated by those skilled in the art, various technical cooperation and operations may be carried out, and the respective exemplary embodiments may be implemented independently of each other or implemented together correlatively.

Hereinafter, various exemplary embodiments of the present disclosure will be described in detail with reference to the accompanying drawings.

FIG. 1 is a configuration view of a microscope system according to an exemplary embodiment of the present disclosure.

Referring to FIG. 1, a microscope system 10 may include a microscope apparatus 100 which acquires an enlarged image of a subject, and a computing apparatus 300 which is operably connected to the microscope apparatus 100, receives an image of the subject from the microscope apparatus 100, and provides the received image.

In various exemplary embodiments, the computing apparatus 300 may be selectively included in the microscope system 10, and the computing apparatus 300 may not be included in a case in which the microscope apparatus 100 includes a display unit that may display an image of the subject.

The microscope apparatus 100 forms an enlarged image of a subject such as an analytical sample by emitting light to a slide glass on which the subject is disposed, and the microscope apparatus 100 captures the formed image, thereby acquiring the enlarged image of the subject. For example, the analytical sample may be a liquid sample such as whole blood, plasma, blood serum, saliva, ocular fluid, cerebrospinal fluid, sweat, urine, milk, ascites fluid, synovial fluid, peritoneal fluid, or cell lysate, or a solid sample of sub-organs in an integumentary system such as tissue, hairs, and nails.

As described above, the image acquired by the microscope apparatus 100 needs to be a high-quality and/or high-resolution image because the acquired image is used to analyze the subject and perform researches and/or diagnoses.

Therefore, the microscope apparatus 100 may use Fourier ptychography that acquires multiple images in accordance with positions of a light source, converts the acquired images into functions of Fourier domain, and acquires a high-quality and/or high-resolution image by combining the converted functions of the images.

A light emitting element array, in which multiple light emitting elements are arranged, may be used as the light source used to acquire an image of a subject. In the light emitting element array, because the amount of light emitted to the subject may vary in accordance with positions of the respective light emitting elements, the images, which are acquired corresponding to the respective light emitting elements, may have different pieces of image information. For example, the light amounts of the light emitting elements positioned at an edge of the light emitting element array may be smaller than the light amounts of the light emitting elements positioned at a central portion of the light emitting element array. Therefore, an image acquired at a position of a particular light source may have high-resolution image information in respect to a particular part of the subject, and an image acquired at a position of another light source may have low-resolution image information in respect to the entire part of the subject.

To acquire a high-quality and/or high-resolution image by using the images having the different pieces of image information as described above, the microscope apparatus 100 is configured such that the amounts of light emitted from the light emitting elements positioned at the edge of the light emitting element array are large, and as a result, the overall light amount of the light emitting element array may become constant. For example, in the microscope apparatus 100, an exposure time of a camera included in the microscope apparatus 100 may be adjusted so that the amount of light emitted from the light emitting elements positioned at the edge of the light emitting element array becomes large, or light intensities of the light emitting elements positioned at the edge of the light emitting element array may be adjusted to be higher than light intensities of the light emitting elements positioned at the central portion of the light emitting element array.

However, if the position of the light source configured in the microscope apparatus 100 is not normal because of a rotational shift or a rotational movement of the light source, an image having noise caused by a position error of the light source may be acquired even though the microscope apparatus 100 operates such that the overall light amount of the light emitting element array is constant.

To prevent the occurrence of noise, the microscope apparatus 100 may perform an operation of checking for an error caused by the rotational shift of the light source and an operation of correcting the checked error. These operations may be performed prior to acquiring the multiple images corresponding to the light source. Specifically, the microscope apparatus 100 acquires multiple images in accordance with at least one of a first light emitting element and a second light emitting element symmetrical to the first light emitting element about one axis among the multiple light emitting elements of the light emitting element array while shifting the position of the light source in one direction. The microscope apparatus 100 may calculate a light intensity sum in respect to the acquired multiple images, check for a position error of the light source based on the calculated light intensity sum, and correct the position of the light source based on the checked position error. Here, the "one direction" may be a direction in which the multiple light emitting elements, which constitute the light source, are arranged, a direction perpendicular to the arrangement direction, or a direction inclined at a particular angle with respect to the arrangement direction. The "one axis" may mean a line that runs through an optical axis, among lines which are parallel to the one direction and perpendicular to the optical axis.

The microscope apparatus 100 may acquire multiple images in accordance with the corrected position of the light source, convert the acquired images into functions of Fourier domain, acquire a high-quality and/or high-resolution image by combining the converted functions of images, and then transmit the acquired image to the computing apparatus 300.

The computing apparatus 300, which is operably connected to the microscope apparatus 100, may receive an image of a subject from the microscope apparatus 100 and display an interface screen, which indicates the received image, through a display of the computing apparatus 300.

In various exemplary embodiments, in the case in which the microscope apparatus 100 includes the display, the microscope apparatus 100 may display the interface screen, which indicates the image of the subject, through the display.

In various exemplary embodiments, in a case in which the display of the microscope apparatus 100 is a touch screen, the microscope apparatus 100 may provide the interface screen for controlling the function of the microscope apparatus 100 through the display. Therefore, a user may control various functions of the microscope apparatus 100 through the provided interface screen.

Hereinafter, the microscope apparatus 100 will be described in more detail with reference to FIGS. 2 and 3.

Figure 2:
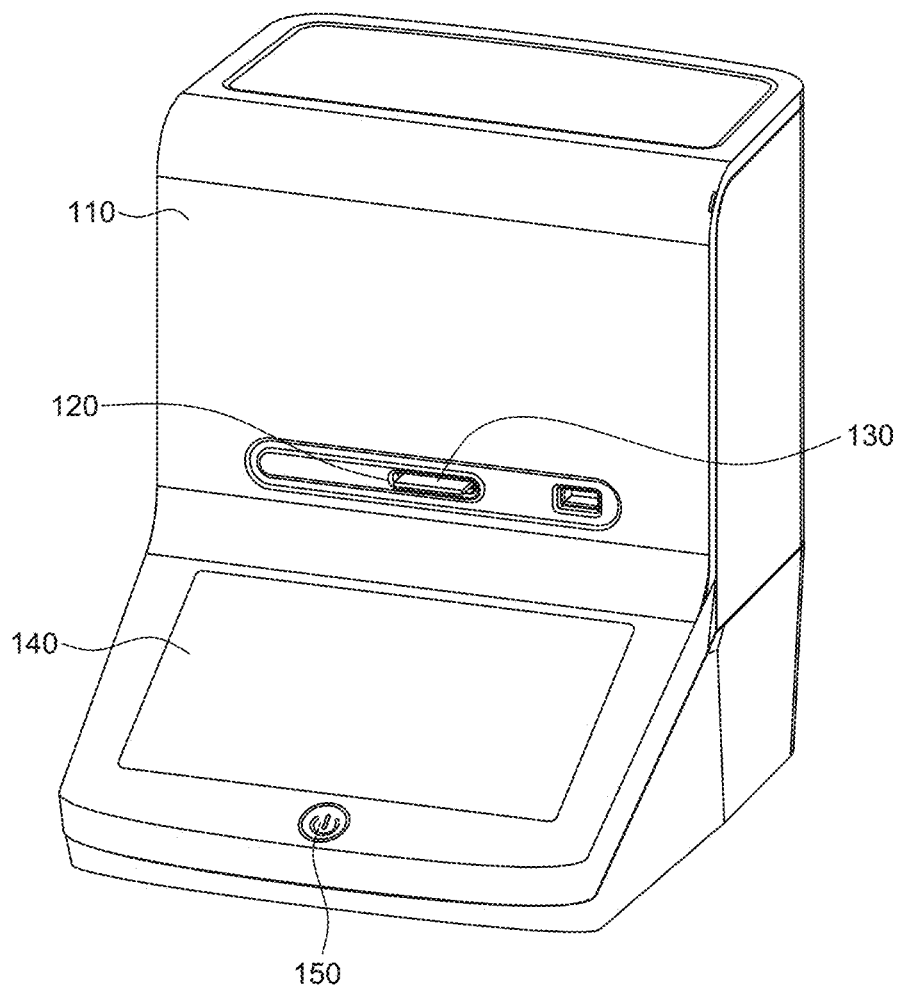
FIG. 2 is a perspective view of a microscope apparatus according to the exemplary embodiment of the present disclosure.
Figure 3:
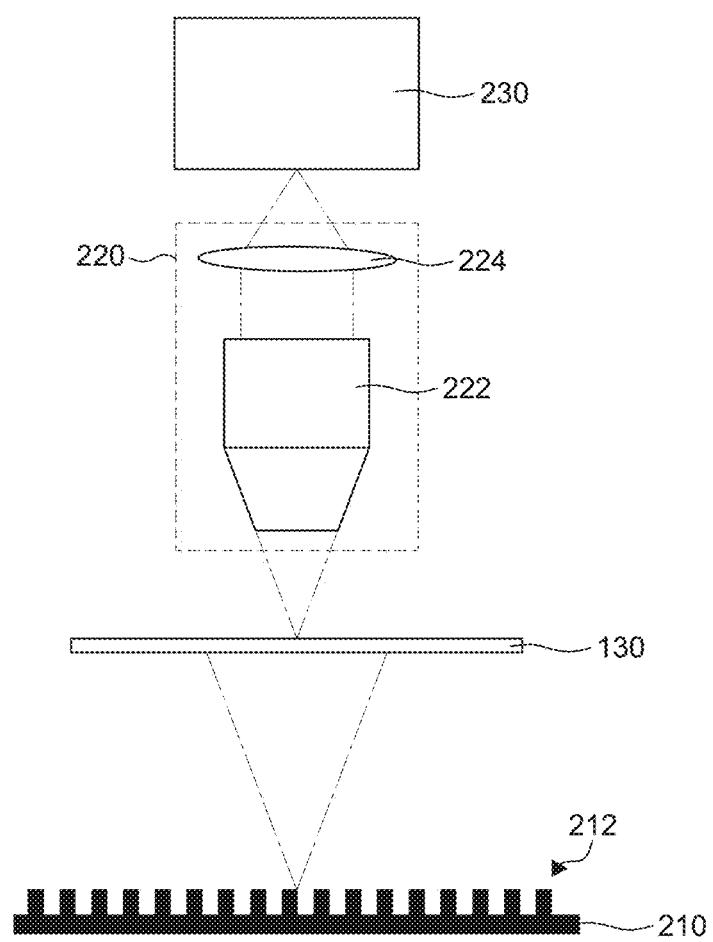
FIG. 3 is a configuration view of an image acquisition unit included in the microscope apparatus according to the exemplary embodiment of the present disclosure.

FIG. 2 is a perspective view of the microscope apparatus according to the exemplary embodiment of the present disclosure, and FIG. 3 is a configuration view of an image acquisition unit included in the microscope apparatus according to the exemplary embodiment of the present disclosure.

Referring to FIGS. 2 and 3, the microscope apparatus 100 may include a housing 110 formed to surround an image acquisition unit 200 for acquiring an enlarged image of a subject.

An insertion portion 120, through which a slide glass 130 having a subject disposed thereon may be inserted into the housing 110, may be formed at one side of the housing 110, and a display unit 140 for displaying various contents related to the microscope apparatus 100 and a power source unit 150 for turning on or off the power of the microscope apparatus 100 may be formed at one side of the housing 110.

The insertion portion 120 may be formed at an appropriate position at one side of the housing 110 such that the slide glass 130 having a subject disposed thereon is placed at an appropriate position for acquiring an enlarged image of the subject when the slide glass 130 is inserted into the housing 110. For example, the appropriate position may be positioned between a light source unit 210 and an optical unit 220 which is disposed in parallel with the light source unit 210 based on an optical axis of the optical unit 220, as illustrated in FIG. 2. The display unit 140 may be selectively included and may provide the user interface related to various functions of the microscope apparatus 100.

In the proposed exemplary embodiment, the insertion portion 120, the display unit 140, and the power source unit 150 are described as being provided at one side of the housing 110, but the present disclosure is not limited thereto, and the insertion portion 120, the display unit 140, and the power source unit 150 may be provided at various positions on the housing 110 to acquire an enlarged image of a subject.

The image acquisition unit 200 provided in the housing 110 may include the light source unit 210, the optical unit 220, and an image sensor 230 to acquire an enlarged image of a subject which is inserted into the housing 110 through the insertion portion 120. The light source unit 210, the optical unit 220, and the image sensor 230 may be disposed in parallel with one another based on the optical axis of the optical unit 220, and the subject, which is inserted through the insertion portion 120, may be disposed in parallel with the light source unit 210, the optical unit 220, and the image sensor 230. When the slide glass 130 having the subject disposed thereon is inserted through the insertion portion 120, the inserted slide glass 130 may be disposed at an appropriate position between the light source unit 210 and the optical unit 220.

The light source unit 210 of the image acquisition unit 200 may be a light emitting diode (LED) array including multiple light emitting elements 212 arranged in one or more rows at predetermined intervals. The multiple light emitting elements 212 may emit light having different colors or the same color. The multiple light emitting elements 212 of the light source unit 210 simultaneously or sequentially emit light, thereby emitting light to the subject disposed in parallel with the light source unit 210 based on the optical axis of the light source unit 210.

The optical unit 220 includes a first lens 222 and a second lens 224, and the optical unit 220 may form an enlarged image of the subject by means of light emitted to the subject from the light source unit 210 and may provide the formed image to the image sensor 230.

The first lens 222 may be an objective lens as a lens that projects the enlarged image of the subject which is formed by means of light emitted to the subject.

The second lens 224 may be a tube lens as a lens that provides the image sensor 230 with the enlarged image projected by the first lens 222. An optical axis of the first lens 222 and an optical axis of the second lens 224 may coincide with each other.

The image sensor 230 may create at least one image by capturing an image of the subject that passes through the optical unit 220. For example, the image sensor 230 may include a charge-coupled device (CCD) sensor and/or a complementary metal oxide semiconductor (CMOS) sensor, or the like.

A specific operation of acquiring a high-quality and/or high-resolution image in the microscope apparatus 100 including the display unit will be described below with reference to FIG. 4.

Figure 4:
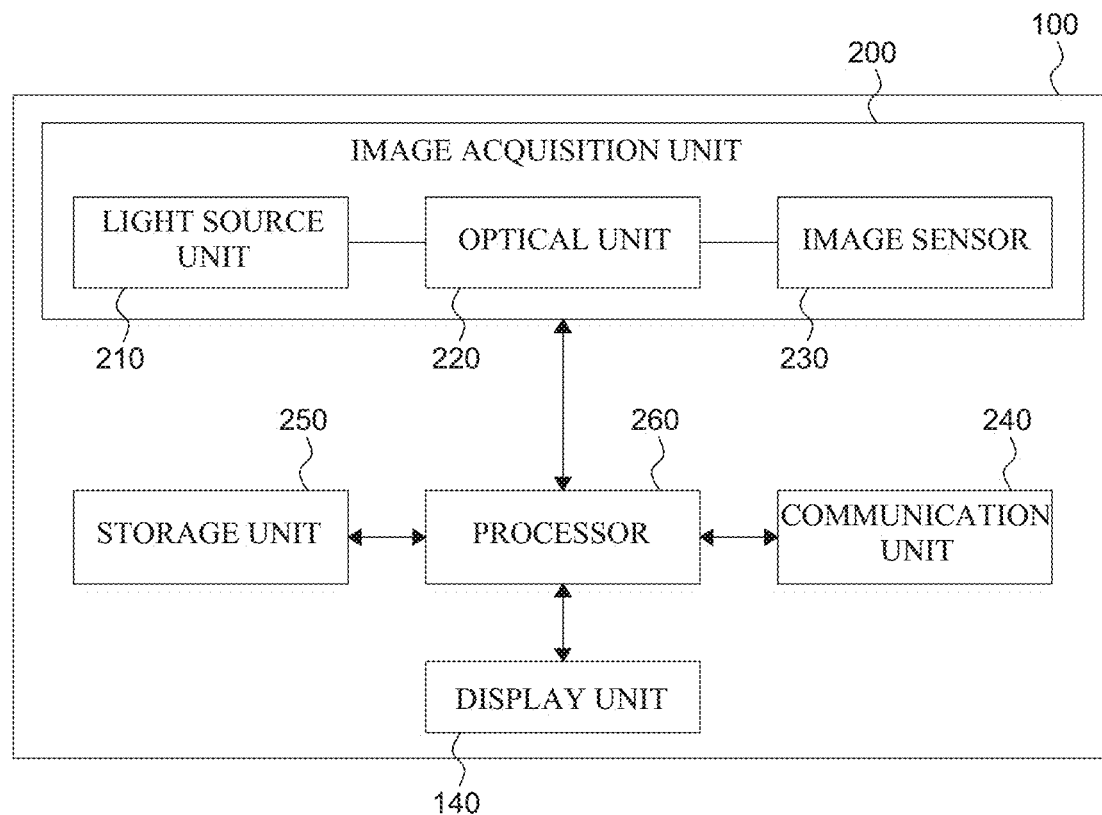
FIG. 4 is a block diagram of the microscope apparatus according to the exemplary embodiment of the present disclosure.

FIG. 4 is a block diagram of the microscope apparatus according to the exemplary embodiment of the present disclosure.

Referring to FIG. 4, the microscope apparatus 100 may include the image acquisition unit 200, the display unit 140, a communication unit 240, a storage unit 250, and a processor 260, and the image acquisition unit 200 may include the light source unit 210, the optical unit 220, and the image sensor 230.

The light source unit 210 is disposed to be movable in parallel and/or rotatable and may be configured as a light emitting element array (or a light emitting element diode array) in which the multiple light emitting elements 212 are arranged.

The optical unit 220 includes multiple lens arrays including multiple lens, and each of the multiple lens arrays may include the first lens 222 such as an objective lens and the second lens 224 such as a tube lens. The first lens 222 and the second lens 224 each may have one or more lenses. The optical axis of the first lens 222 and the optical axis of the second lens 224 coincide with each other, and the first lens 222 and the second lens 224 may be disposed in parallel with each other with respect to the corresponding optical axes. The first lens 222 may be disposed to be closer to the subject than the second lens 224 with respect to the subject.

The lenses of the optical unit 220 form the enlarged image of the subject based on the light emitted to the subject by the light source unit 210 and may transmit the formed image to the image sensor 230.

The image sensor 230 may capture the image formed by the optical unit 220, thereby acquiring the image of the subject which is within a visual field range of the optical unit 220.

The light source unit 210, the optical unit 220, and the image sensor 230 may be disposed in parallel with one another based on the optical axis. The subject, which is disposed at the appropriate position between the light source unit 210 and the optical unit 220, may also be disposed in parallel with the light source unit 210, the optical unit 220, and the image sensor 230 based on the optical axis.

The display unit 140 may display various types of contents (e.g., texts, images, videos, icons, banners, or symbols, etc.) to a user. Specifically, the display unit 140 may display a user interface screen for controlling various functions of the microscope apparatus 100. For example, the various functions may include a function of correcting a position of the light source of the microscope apparatus 100, a function of acquiring an image of a subject, a function of setting lens focusing of the microscope apparatus 100, a function of displaying a preview image, and/or a function of adjusting lens magnifications. In various exemplary embodiments, the display unit 140 may display the acquired image. In this case, the various functions may further include a function of performing zooming-in/zooming-out operations in respect to the acquired image.

In various exemplary embodiments, the display unit 140 may include a touch screen and receive inputs, for example, touching, gesture, approaching, dragging, swiping, or hovering with an electronic pen or a part of the user's body.

The communication unit 240 is connected such that the microscope apparatus 100 may communicate with external devices. The communication unit 240 is connected to the computing apparatus 300 through wired/wireless communication and may transmit and receive various pieces of information. Specifically, the communication unit 240 may transmit the image of the subject to the computing apparatus 300 so that the computing apparatus 300 displays or stores the image of the subject.

The storage unit 250 may store various data used when the microscope apparatus 100 checks for an error in respect to the position of the light source and corrects the error. In addition, the storage unit 250 may store the image of the subject. In various exemplary embodiments, the storage unit 250 may also store graphic data used to configure a user interface related to the various functions of the microscope apparatus 100.

In various exemplary embodiments, the storage unit 250 may include at least one storage medium among a flash type memory, a hard disc type memory, a multimedia card micro type memory, a card-type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. The microscope apparatus 100 may operate in connection with a web storage that performs the storage function of the storage unit 250 on the Internet.

The processor 260 is operably connected to the image acquisition unit 200, the display unit 140, the communication unit 240, and the storage unit 250 and may perform various instructions for correcting the position of the light source of the microscope apparatus 100 and acquiring a high-quality and/or high-resolution image of the subject based on the corrected position of the light source.

To correct the position of the light source unit 210, the processor 260 may check for a position error of the light source unit 210 and correct the position of the light source unit 210 based on the checked position error. Specifically, the processor 260 may allow at least one of a first light emitting element and a second light emitting element, which is symmetrical to the first light emitting element about one axis, among the multiple light emitting elements 212, which constitute the light source unit 210, to emit multiple lights to the subject, while shifting the position of the light source unit 210 in one direction. Here, the first light emitting element and the second light emitting element may have different color values or the same color value and may be included in a particular region of the light emitting element array which corresponds to a light incident range in accordance with a numerical aperture (NA) of the light source unit 210. In particular, in a case in which the first light emitting element and the second light emitting element have different color values, the first light emitting element and the second light emitting element simultaneously or sequentially emit light. In a case in which the first light emitting element and the second light emitting element have the same color value, the first light emitting element and the second light emitting element may sequentially emit light.

For example, the processor 260 sets a line, which extends in a direction identical to the movement direction of the light source unit 210 among multiple lines that perpendicularly traverse the optical axis, as one axis, and the processor 260 may allow a red light emitting element, which is positioned at a left side in a particular region based on the one axis, and a blue light emitting element, which is symmetrical to the red light emitting element about the one axis, to simultaneously or sequentially emit light. In this case, the blue light emitting element may be positioned at a right side in the particular region based on the one axis. In various exemplary embodiments, the processor 260 may allow one red light emitting element, which is positioned at the left side in the particular region based on the one axis, and another red light emitting element, which is symmetrical to the one red light emitting element about the one axis, to sequentially emit light. In various exemplary embodiments, the processor 260 may allow one blue light emitting element, which is positioned at the left side in the particular region based on the one axis, and another blue light emitting element, which is symmetrical to the one blue light emitting element about the one axis, to sequentially emit light. In the proposed exemplary embodiment, the red or blue light emitting element is described, but the present disclosure is not limited thereto, and the light emitting elements having different colors and various color values or the light emitting elements having the same color may be used.

The processor 260 may form an enlarged image of the subject based on the emitted light by means of the optical unit 220 and may acquire multiple images by capturing the enlarged images by means of the image sensor 230. As described above, the processor 260 may acquire the multiple images in accordance with a change in position of the light source unit 210 by changing the position of the light source unit 210. For example, the acquired multiple images may include red images and blue images or may include only red or blue images.

The processor 260 may calculate a light intensity sum in respect to the respective acquired images and may check for a position error of the light source unit 210 based on the calculated light intensity sum. Here, the position error may mean a rotation error of the light source unit 210, and the rotation error of the light source unit 210 may mean a degree to which the light source unit 210 is rotated about the optical axis of the optical unit 220. Specifically, the processor 260 may create two graphs by displaying the calculated light intensity sum in respect to the respective acquired images onto a two-dimensional space in accordance with a change in position of the light source unit 210. For example, the processor 260 may create a first type two-dimensional graph by displaying the light intensity sum in respect to the respective acquired images onto a two-dimensional space in accordance with a change in position of the light source unit 210 while corresponding to the red light emitting element. Further, the processor 260 may create a second type two-dimensional graph by displaying the light intensity sum in respect to the respective acquired images onto a two-dimensional space in accordance with a change in position of the light source unit 210 while corresponding to the blue light emitting element. In various exemplary embodiments, the processor 260 may create the first type two-dimensional graph by displaying the light intensity sum in respect to the respective acquired images onto a two-dimensional space in accordance with a change in position of the light source unit 210 while corresponding to the red light emitting element. Further, the processor 260 may also create the second type two-dimensional graph by displaying the light intensity sum in respect to the respective acquired images onto a two-dimensional space in accordance with a change in position of the light source unit 210 while corresponding to another red light emitting element. The centers of mass of the two two-dimensional graphs, which are created as described above, may coincide with each other if there is no rotation error of the light source unit 210. However, if there is a position error of the light source unit 210, there may be a difference value between the centers of mass of the graphs. Therefore, the processor 260 may determine that there is a position error of the light source unit 210 if there is a difference value between the centers of mass of the respective graphs.

The processor 260 may correct the position of the light source unit 210 based on the checked position error. Specifically, when there is a difference value between the centers of mass of the respective graphs, the processor 260 may correct the position of the light source unit 210 by rotating the light source unit 210 at a particular angle so that the centers of mass of the respective graphs coincide with each other.

When the correction of the position of the light source unit 210 is completed, the processor 260 acquires the enlarged image of the subject by means of the image acquisition unit 200, and the processor 260 may display an interface screen, which indicates the acquired enlarged image, on the display unit 140 or may transmit the enlarged image to the computing apparatus 300 through the communication unit 240.

In various exemplary embodiments, specifically, to correct the position of the light source unit 210 by using the light emitting elements having the same color, the processor 260 may allow one first light emitting element, which emits light having a first color, to sequentially emit light while shifting the position of the light source unit 210 in one direction, thereby emitting multiple lights to the subject.

The processor 260 forms the enlarged image of the subject by means of the optical unit 220 based on the emitted light and acquires the multiple images by capturing the enlarged images by means of the image sensor 230, and then the processor 260 may create the first type two-dimensional graph by displaying the light intensity sum in respect to the respective acquired images onto a two-dimensional space.

The processor 260 may allow another second light emitting element, which is symmetrical to the first light emitting element about the one axis and emits light having a color identical to the first color, to sequentially emit light while shifting the position of the light source unit 210 in the one direction, thereby emitting multiple lights to the subject.

The processor 260 forms the enlarged image of the subject by means of the optical unit 220 based on the emitted light and acquires the multiple images by capturing the enlarged images by means of the image sensor 230, and then the processor 260 may create the second type two-dimensional graph by displaying the light intensity sum in respect to the respective acquired images onto a two-dimensional space.

The processor 260 checks for whether there is a difference value between the centers of mass of the first type two-dimensional graph and the second type two-dimensional graph. When there is a difference value, the processor 260 may correct the position of the light source unit 210 by rotating the light source unit 210 at a particular angle so that the centers of mass of the first type two-dimensional graph and the second type two-dimensional graph coincide with each other. In the above-mentioned various exemplary embodiments, the light emitting elements having the same color are used, but the present disclosure is not limited thereto, and the above-mentioned various exemplary embodiments may also be applied to a case in which the light emitting elements having different colors are used.

In various exemplary embodiments, specifically, to correct the position of the light source unit 210 by using the light emitting elements having the same color, the processor 260 may allow the first light emitting element, which emits light having the first color, and the second light emitting element, which is symmetrical to the first light emitting element about the one axis and emits light having the color identical to the first color, to emit light while shifting the position of the light source unit 210 in the one direction by predetermined distances, thereby sequentially emitting multiple lights to the subject. For example, the processor 260 may repeatedly perform an operation of shifting the position of the light source unit 210 in the one direction by a predetermined distance, allowing the first light emitting element and the second light emitting element to sequentially emit light, shifting the position of the light source unit 210 by a predetermined distance, and then allowing the first light emitting element and the second light emitting element to sequentially emit light. This operation may be repeated by the appropriate number of times for the processor 260 to correct the position of the light source unit 210.

The processor 260 may form the enlarged image of the subject by means of the optical unit 220 based on the light emitted by the first light emitting element and the light emitted by the second light emitting element and may acquire the multiple images by capturing the enlarged images by means of the image sensor 230. The processor 260 may calculate the light intensity sum in respect to the respective acquired images while corresponding to the first light emitting element and may create the first type two-dimensional graph by displaying the calculated light intensity sum onto a two-dimensional space. The processor 260 may calculate the light intensity sum in respect to the respective acquired images while corresponding to the second light emitting element and may create the second type two-dimensional graph by displaying the calculated light intensity sum onto a two-dimensional space.

The processor 260 checks for whether there is a difference value between the centers of mass of the first type two-dimensional graph and the second type two-dimensional graph. When there is a difference value, the processor 260 may correct the position of the light source unit 210 by rotating the light source unit 210 at a particular angle so that the centers of mass of the first type two-dimensional graph and the second type two-dimensional graph coincide with each other. In the above-mentioned various exemplary embodiments, the light emitting elements having the same color are used, but the present disclosure is not limited thereto, and the above-mentioned various exemplary embodiments may also be applied to the case in which the light emitting elements having different colors are used.

As described above, the present disclosure may acquire and provide a high-quality and/or high-resolution enlarged image of a subject by minimizing image noise caused by a position error of the light source.

Figure 5:
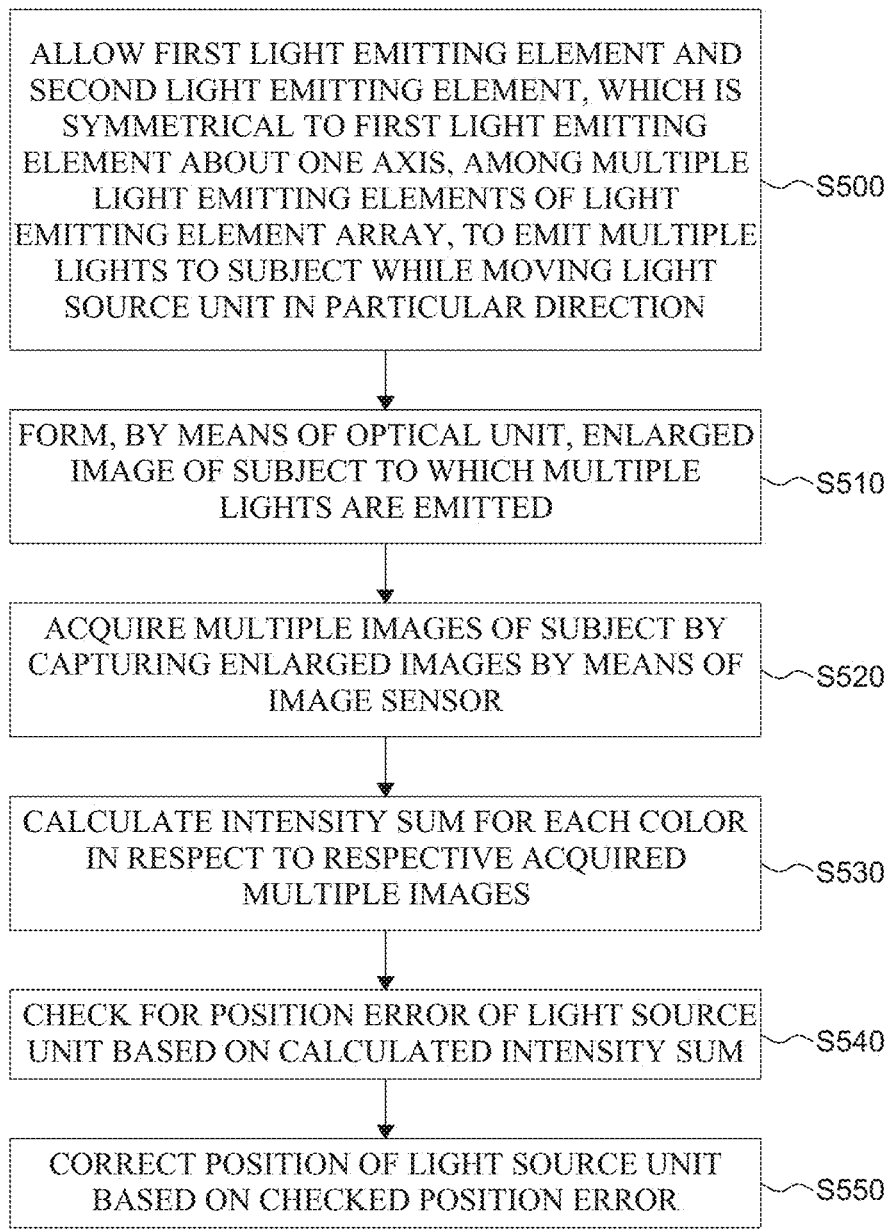
FIG. 5 is a flowchart illustrating a method of correcting a position of a light source in the microscope apparatus according to the exemplary embodiment of the present disclosure.

FIG. 5 is a flowchart illustrating a method of correcting a position of a light source in the microscope apparatus according to the exemplary embodiment of the present disclosure. The operations to be described below may be performed by the processor 260 of the microscope apparatus 100.

Referring to FIG. 5, the microscope apparatus 100 allows at least one of the first light emitting element and the second light emitting element, which is symmetrical to the first light emitting element about the one axis, among the multiple light emitting elements 212 of the light emitting element array to emit multiple lights to the subject while moving the light source unit 210 in the one direction (S500). Here, the first light emitting element and the second light emitting element may have different color values or the same color value. The first light emitting element and the second light emitting element may simultaneously or sequentially emit light in the case in which the first light emitting element and the second light emitting element have different color values, and the first light emitting element and the second light emitting element may sequentially emit light when the first light emitting element and the second light emitting element have the same color value.

The microscope apparatus 100 forms, by means of the optical unit 220, the enlarged image of the subject to which the multiple lights are emitted (S510) and acquires the multiple images of the subject by capturing the enlarged images by means of the image sensor 230 (S520).

The microscope apparatus 100 calculates the light intensity sum in respect to the respective acquired multiple images (S530) and checks for a position error of the light source unit 210 based on a difference of the calculated light intensity sum (S540). Specifically, the microscope apparatus 100 creates a two-dimensional graph by displaying, onto a two-dimensional space, the light intensity sum in respect to the respective images which is calculated in accordance with a change in position of the light source unit 210 while respectively corresponding to the first light emitting element and the second light emitting element, and the microscope apparatus 100 may calculate a difference value between the centers of mass of the created two-dimensional graph. When the difference value is calculated, the microscope apparatus 100 may determine that there is a position error of the light source unit 210.

The microscope apparatus 100 corrects the position of the light source unit 210 based on the checked position error (S550). Specifically, the microscope apparatus 100 may correct the position of the light source unit 210 by rotating the light source unit 210 at a particular angle so that the calculated difference value converges into '0'.

With this process, the present disclosure checks for a position error of the light source prior to acquiring the enlarged image of the subject and then corrects the checked position error, thereby acquiring a high-quality and/or high-resolution enlarged image of the subject by minimizing image noise caused by the position error of the light source.

Figure 6:
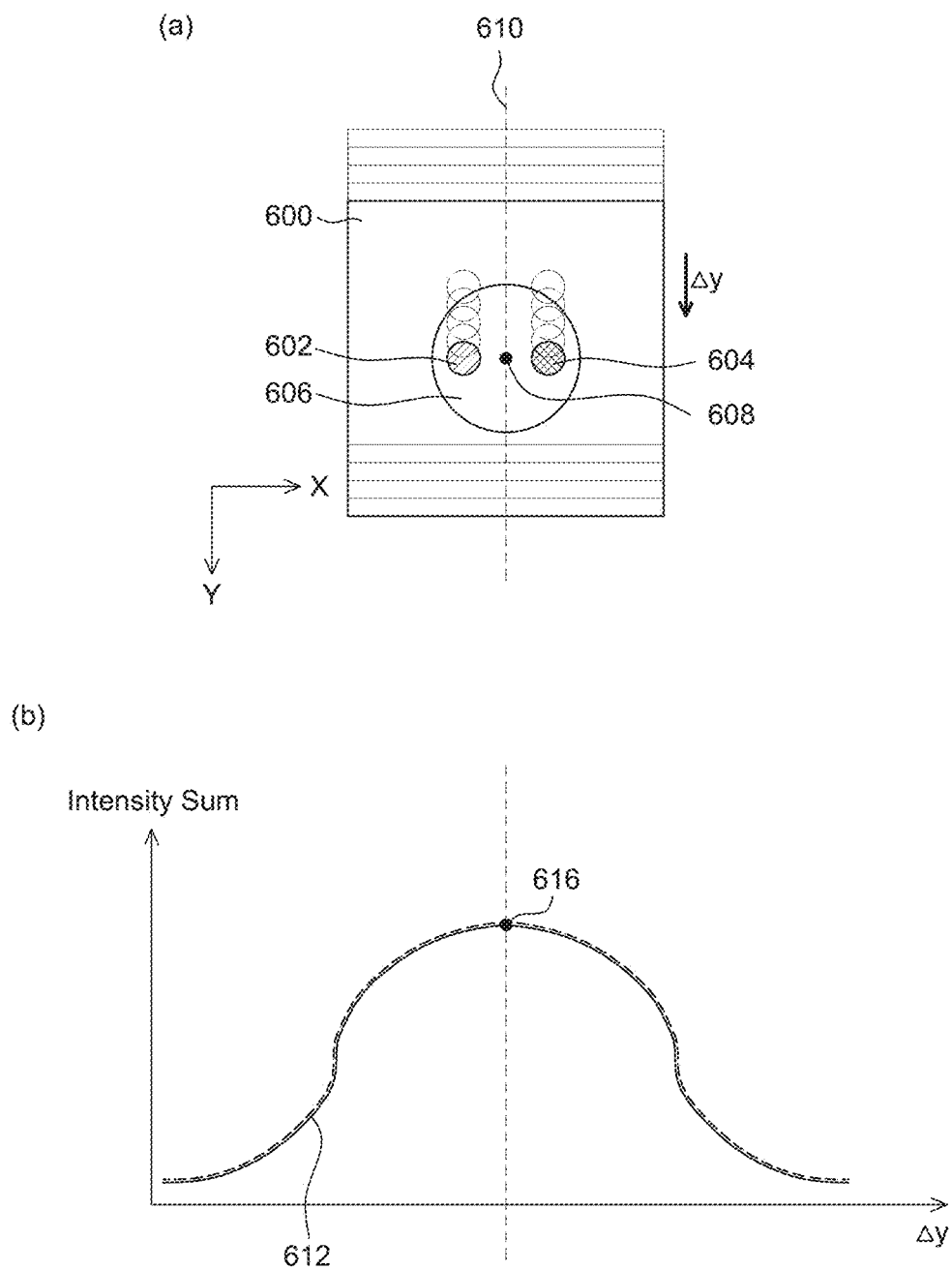
FIGS. 6 and 7 are exemplified views for explaining the method of correcting the position of the light source in the microscope apparatus according to the exemplary embodiment of the present disclosure.
Figure 7:
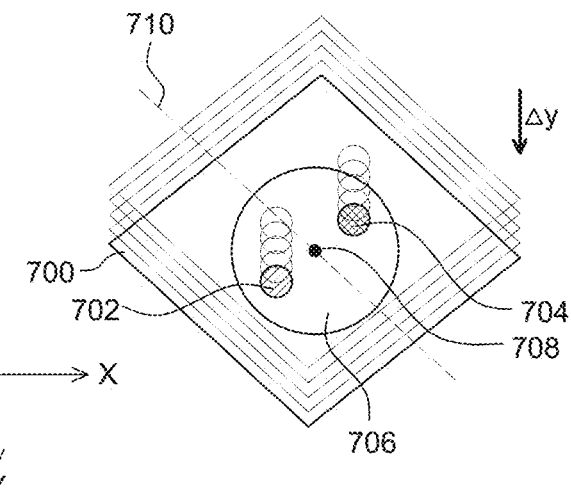
Figure 7:
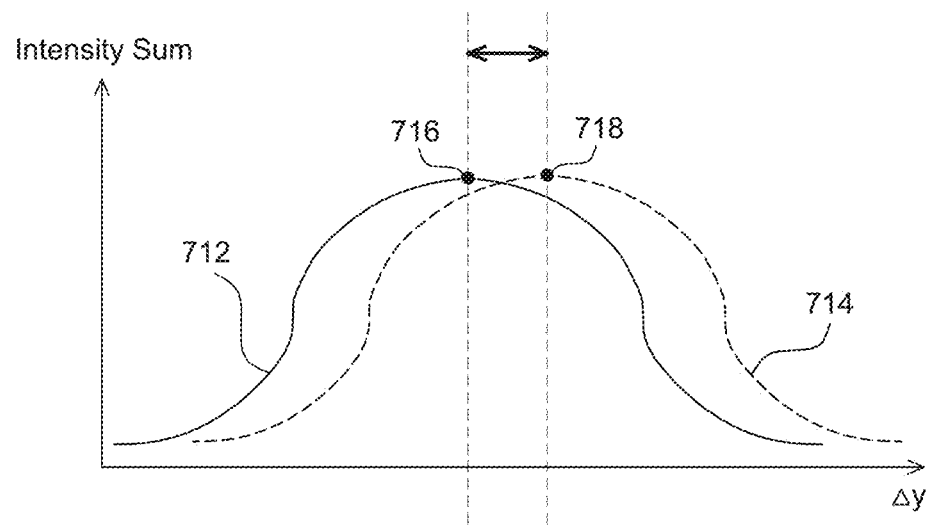

FIGS. 6 and 7 are exemplified views for explaining the method of correcting the position of the light source in the microscope apparatus according to the exemplary embodiment of the present disclosure. In the proposed exemplary embodiment, an example in which a first light emitting element 602 and a second light emitting element 604 have different color values will be described.

Referring to FIG. 6A, the microscope apparatus 100 may allow the first light emitting element 602 and the second light emitting element 604, which is symmetrical to the first light emitting element 602 about one axis 610, among multiple light emitting elements included in a particular region 606 of a light emitting element array 600, to simultaneously or sequentially emit light while moving the light emitting element array 600 in a y-axis direction. Here, the particular region 606 may be a partial region of the light emitting element array 600 which corresponds to a light incident range in accordance with a numerical aperture (NA) of the optical unit 220, and the one axis 610 may be an axis that traverses a center 608 of the particular region 606. For example, in a case in which the light emitting elements of the light emitting element array 600 are arranged in an x-axis direction, the y-axis direction may be a direction perpendicular to the direction in which the light emitting elements are arranged. As described above, in the microscope apparatus 100, the enlarged image of the subject may be formed by means of the optical unit 220 as the multiple lights emitted to the subject pass through the optical unit 220, and the multiple images may be created as the enlarged images are captured by the image sensor 230.

The microscope apparatus 100 may calculate the light intensity sums in respect to the respective multiple images acquired in accordance with a change in position of the light source unit 210, and the microscope apparatus 100 may create the two-dimensional graph by displaying the calculated light intensity sum onto a two-dimensional space, as illustrated in FIG. 6B. Referring to FIG. 6B, the created two-dimensional graphs 612 and 614 may indicate the light intensity sum in accordance with a change Δy in position of the light emitting element array 600.

The microscope apparatus 100 may calculate the centers of mass of the respective two-dimensional graphs created as described above and may check for whether there is a difference between the calculated centers of mass. For example, if there is no rotation error of the light emitting element array 600, there may be no difference between the centers of mass 616 of the two-dimensional graph 612 corresponding to the first light emitting element 602 and the two-dimensional graph 614 corresponding to the second light emitting element 604, as illustrated in FIG. 6B. In this case, the microscope apparatus 100 may perform the operation of creating the enlarged image of the subject without correcting the position of the light emitting element array 600.

Referring to FIG. 7A, the microscope apparatus 100 may allow a first light emitting element 702 and a second light emitting element 704, which is symmetrical to the first light emitting element about one axis 710, among multiple light emitting elements included in a particular region 706 of a light emitting element array 700, to simultaneously or sequentially emit light while moving the light emitting element array 700 in the y-axis direction. Here, the particular region 706 may be a partial region of the light emitting element array 700 which corresponds to a light incident range in accordance with a numerical aperture of the optical unit 220 illustrated in FIG. 2, and the one axis 710 may be an axis that traverses a center 708 of the particular region 706. As described above, in the microscope apparatus 100, the enlarged image of the subject may be formed by means of the optical unit 220 as the multiple lights emitted to the subject pass through the optical unit 220, and the multiple images may be created as the enlarged images are captured by the image sensor 230.

The microscope apparatus 100 may calculate the light intensity sums in respect to the respective multiple images acquired in accordance with a change in position of the light source unit 210, and the microscope apparatus 100 may create the two-dimensional graph by displaying the calculated light intensity sum onto a two-dimensional space, as illustrated in FIG. 7B. Referring to FIG. 7B, the created two-dimensional graphs 712 and 714 may indicate the light intensity sum in accordance with a change Δy in position of the light source unit 700.

The microscope apparatus 100 may calculate the centers of mass of the respective two-dimensional graphs created as described above and check for whether there is a difference between the calculated centers of mass, and when there is a difference, the microscope apparatus 100 may correct the position of the light emitting element array 700 based on the difference. For example, as illustrated in FIG. 7B, there is a difference between a center of mass 716 of a two-dimensional graph 712 corresponding to the first light emitting element 702 and a center of mass 718 of a two-dimensional graph 714 corresponding to the second light emitting element 704. In this case, the microscope apparatus 100 may correct the position of the light emitting element array 600 by rotating the light emitting element array 600 so that the center of mass 716 of the two-dimensional graph 712 corresponding to the first light emitting element 702 and the center of mass 718 of the two-dimensional graph 714 of the second light emitting element 704 coincide with each other.

Figure 8:
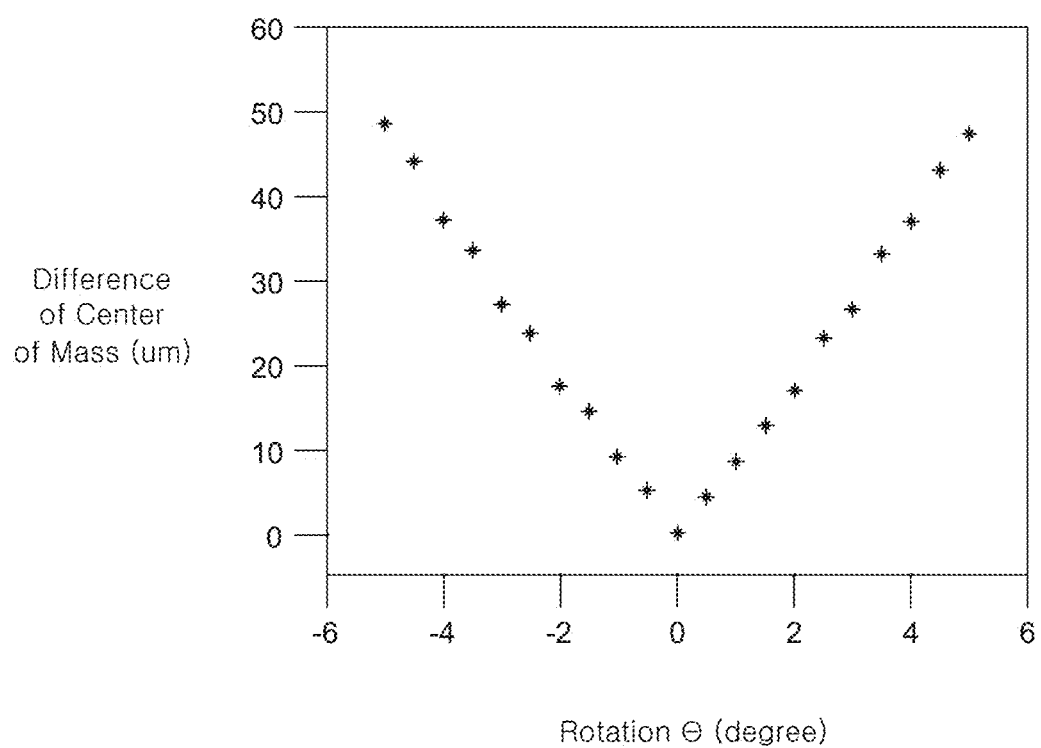
FIG. 8 is a view illustrating a degree of rotation of the light source in accordance with a difference between centers of mass of respective graphs according to the exemplary embodiment of the present disclosure.

FIG. 8 is a view illustrating a degree of rotation of the light source in accordance with a difference between the centers of mass of the respective graphs according to the exemplary embodiment of the present disclosure. Specifically, FIG. 8 illustrates a rotation angle (rotation degree Θ) at which the light source units 210, 600, and 700 are rotated based on the difference (μm) between the centers of mass of the respective graphs.

Referring to FIGS. 6 and 8, a difference value between the centers of mass converges into '0' when the center of mass of the secondary graph 612 corresponding to the first light emitting element 602 and the center of mass of the secondary graph 614 corresponding to the second light emitting element 604 coincide with each other, and as a result, the rotation angle by which the light emitting element array 600 is rotated may converge into '0 degree'. In this case, because there is no position error of the light source unit 210, the microscope apparatus 100 may not correct the position of the light source unit 210.

Referring to FIGS. 7 and 8, when there is a difference between the center of mass 716 of the secondary graph 712 corresponding to the first light emitting element 702 and the center of mass 718 of the secondary graph 614 corresponding to the second light emitting element 704, the microscope apparatus 100 checks for a rotation angle Θ of the light emitting element array 700 based on the difference value and rotates the light emitting element array 700 based on the checked rotation angle so that the center of mass 716 of the secondary graph 712 corresponding to the first light emitting element 702 and the center of mass 718 of the secondary graph 614 corresponding to the second light emitting element 704 coincide with each other, thereby correcting the position of the light emitting element array 700. For example, the rotation angle Θ of the light emitting element array 700 may converge into −2 degrees when a difference value between the center of mass 716 of the secondary graph 712 corresponding to the first light emitting element 702 and the center of mass 718 of the secondary graph 614 corresponding to the second light emitting element 704 converges into 20 μm. In this case, the microscope apparatus 100 may correct the position of the light emitting element array 700 by rotating the light emitting element array 700 by 2 degrees.

FIGS. 9A, 9B, 9C, and 9D are exemplified views illustrating the interface screens displayed by the display unit of the microscope apparatus according to the exemplary embodiment of the present disclosure.

Figure 9A:
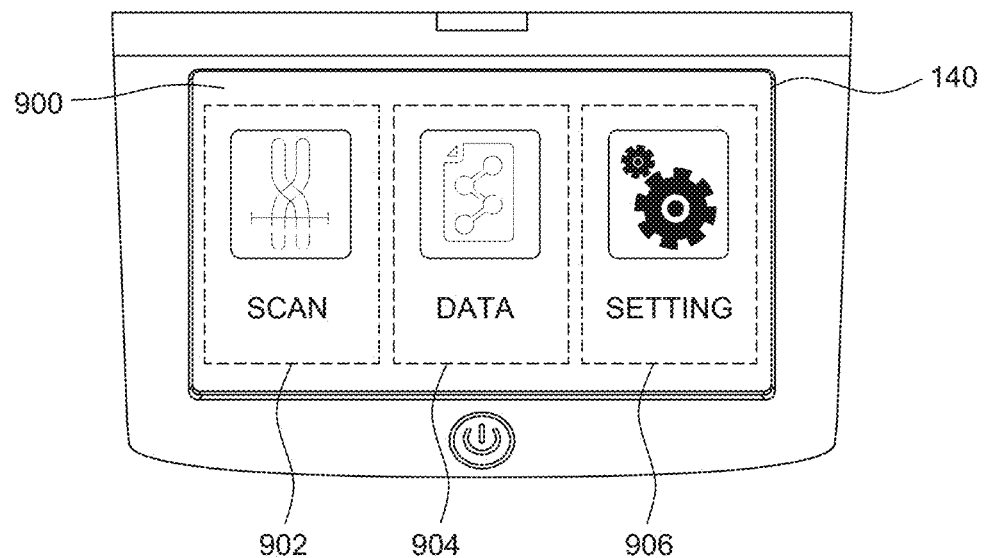
FIGS. 9A, 9B, 9C, and 9D are exemplified views illustrating interface screens displayed by a display unit of the microscope apparatus according to the exemplary embodiment of the present disclosure.

Referring to FIG. 9A, the display unit 140 of the microscope apparatus 100 may display an interface screen 900 related to various functions of the microscope apparatus 100. For example, when the subject is inserted through the insertion portion 120 and power of the microscope apparatus 100 is turned on by means of the power source unit 150, the display unit 140 may display the interface screen 900.

The interface screen 900 may include a first icon 902 for creating the enlarged image of the subject, a second icon 904 for ascertaining the stored enlarged image, and a third icon 906 related to setting of the microscope apparatus 100. When the first icon 902 is selected by a user, the display unit 140 may display an interface screen 910 for creating the enlarged image, as illustrated in FIG. 9B.

Figure 9B:
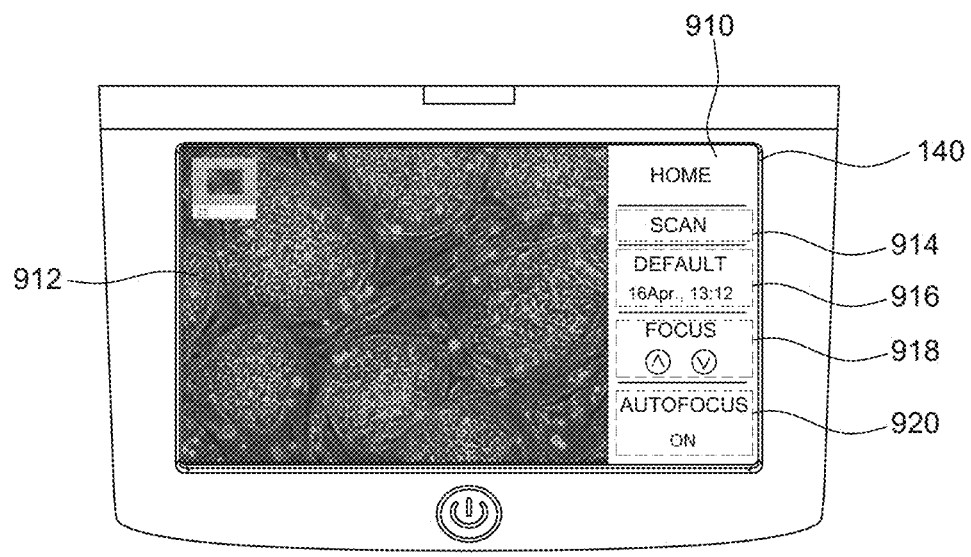

Referring to FIG. 9B, the interface screen 910 may include a first icon 914 for capturing (or scanning) the enlarged image of the subject together with a preview region 912 for previewing the enlarged image of the subject, a first text 916 for indicating a name, a size, and a ratio basically set to the image, a second icon 918 for adjusting a focus of the light source unit, and a second text 920 for indicating a use or non-use of an auto-focusing function.

Figure 9C:
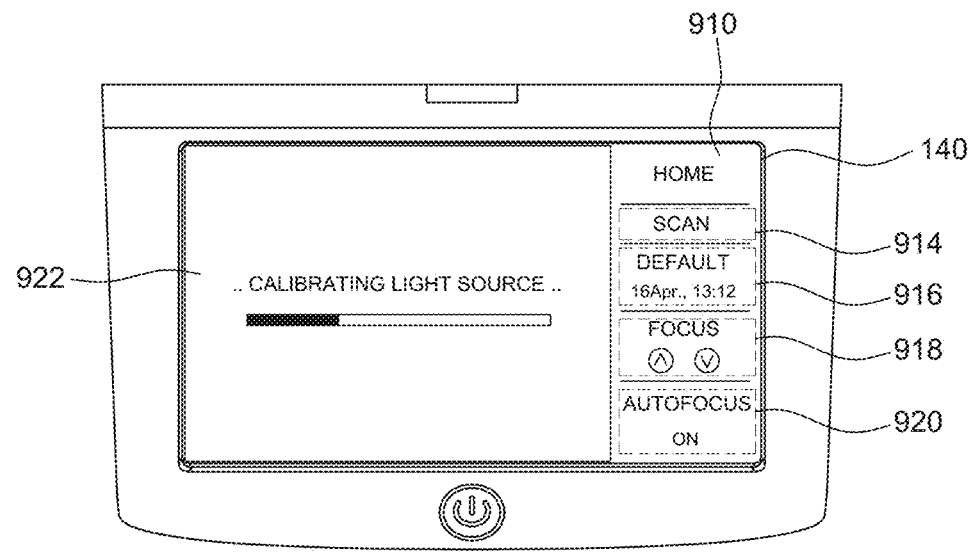
Figure 9D:
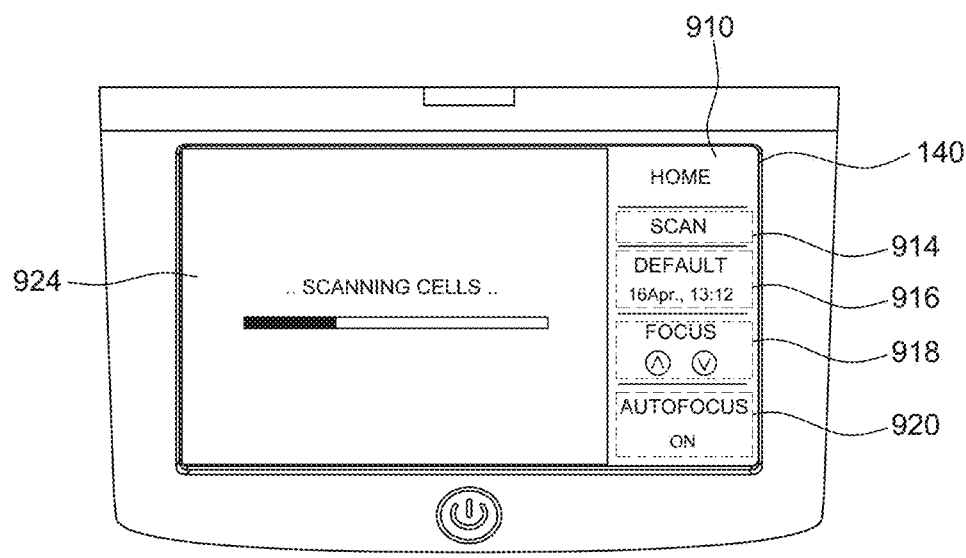

When the first icon 914 is selected by a user, the microscope apparatus 100 may correct the position of the light source and may display a graphic screen 922 that indicates the correction of the light source, as illustrated in FIG. 9C, by means of the display unit 140 during the position correction. When the correction is completed, the microscope apparatus 100 may perform the operation of acquiring the enlarged image and may display a graphic screen 924 that indicates an image acquisition, as illustrated in FIG. 9D, by means of the display unit 140 during the acquisition operation. When the operation of acquiring the enlarged image is completed, the microscope apparatus 100 may display the enlarged image by means of the display unit 140 or may transmit the enlarged image to the computing apparatus 300.

In the proposed exemplary embodiment, the interface screens described with reference to FIGS. 9A, 9B, 9C, and 9D are not limited to the above-mentioned description, but various interface screens may be applied.

With this process, the present disclosure checks for a position error of the light source prior to acquiring the enlarged image of the subject and then corrects the checked position error, thereby acquiring a high-quality and/or high-resolution enlarged image of the subject by minimizing image noise caused by the position error of the light source.

The apparatus and the method according to the exemplary embodiment of the present disclosure may be implemented in the form of program instructions executable by means of various computer means and then written in a computer-readable recording medium. The computer-readable medium may include program instructions, data files, data structures, or the like, in a stand-alone form or in a combination thereof.

The program instructions written in the computer-readable medium may be designed and configured specifically for the present disclosure or may be publicly known and available to those skilled in the field of computer software. Examples of the computer-readable recording medium may include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. In addition, the above-mentioned media may be transmission media such as optical or metal wires and waveguides including carrier waves for transmitting signals for designating program instructions, data structures, and the like. Examples of the program instructions may include machine codes made by, for example, a compiler, as well as high-language codes that may be executed by an electronic data processing device, for example, a computer, by using an interpreter.

The above-mentioned hardware devices may be configured to operate as one or more software modules in order to perform the operation of the present disclosure, and the opposite is also possible.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical spirit in the equivalent scope thereto should be construed as falling within the scope of the present disclosure.

What is claimed is:

1. A microscope apparatus comprising:
a light source unit configured to emit light onto a subject and including a light emitting element array with multiple light emitting elements;
an optical unit arranged in parallel with the subject and configured to form an enlarged image of the subject;
an image sensor configured to acquire the enlarged image; and
a processor in communication with the light source unit, the optical unit, and the image sensor and configured to:
cause at least one of a first light emitting element and a second light emitting element, which is symmetrical to the first light emitting element about one axis, among the multiple light emitting elements, to at least one of simultaneously and sequentially emit light onto the subject multiple times and change a position of the light source unit in one direction;
acquire a plurality of enlarged images of the subject in accordance with the change in the position of the light source unit;
calculate a plurality of light intensity sums for the plurality of enlarged images;
check for a position error of the light source unit based on the plurality of light intensity sums; and
correct a position of the light source unit based on the position error.

2. The microscope apparatus of claim 1, wherein the processor is further configured to:
emit light onto the subject using the light source unit after the position of the light source unit is corrected; and
acquire the enlarged image using the image sensor.

3. The microscope apparatus of claim 1, wherein the one direction includes one of:
an arrangement direction in which the multiple light emitting elements are arranged;
a direction perpendicular to the arrangement direction; and
a direction which is inclined at a predetermined angle with respect to the arrangement direction.

4. The microscope apparatus of claim 1, wherein the one axis includes a line traversing an optical axis of lines that are parallel to the one direction and perpendicular to an optical axis of the optical unit.

5. The microscope apparatus of claim 1, wherein the first light emitting element and the second light emitting element have different color values or a same color value and are arranged in a predetermined region of the light emitting element array corresponding to a light incident range in accordance with a numerical aperture of the light source unit.

6. The microscope apparatus of claim 1, wherein the processor is further configured to:
create graphs by displaying the plurality of light intensity sums in two-dimensional space;

calculate one or more difference values between centers of mass of the graphs; and check for a rotation error of the light source unit based on the one or more difference values.

7. The microscope apparatus of claim 6, wherein the processor is configured to correct the position of the light source unit by rotating the light source unit so that the centers of mass of the graphs coincide.

8. The microscope apparatus of claim 1, wherein the processor is further configured to use Fourier ptychography to acquire the enlarged image of the subject.

9. The microscope apparatus of claim 1, wherein the processor is further configured to:
acquire first enlarged images using the first light emitting element;
calculate first light intensity sums for the first enlarged images;
create a first type graph by displaying the first light intensity sums in two-dimensional space in accordance with the change in position of the light source unit corresponding to the first enlarged images;
acquire second enlarged images using the second light emitting element;
calculate second light intensity sums for the second enlarged images corresponding to the second light emitting element;
create a second type graph by displaying the second light intensity sums in two-dimensional space in accordance with the change in position of the light source unit corresponding to the second enlarged images;
calculate one or more difference values between centers of mass of the first type graph and the second type graph; and
check for the position error of the light source unit based on the one or more difference values.

10. The microscope apparatus of claim 1, wherein the processor is further configured to
repeat an operation of causing the first light emitting element and the second light emitting element to emit light while moving the light source unit in the one direction by a predetermined distance;
acquire enlarged images corresponding to the first light emitting element and the second light emitting element;
calculate first light intensity sums corresponding to first enlarged images for the first light emitting element and second light intensity sums corresponding to second enlarged images for the second light emitting element;
create a first type graph by displaying the first light intensity sums in two-dimensional space in accordance with the change in position of the light source unit for the first enlarged images;
create a second type graph by displaying the second light intensity sums in the two-dimensional space in accordance with the change in position of the light source unit for the second enlarged images;
calculate one or more difference values between centers of mass of the first type graph and the second type graph; and
check for a rotation error of the light source unit based on the one or more difference values.

11. A method of correcting a position of a light source in a microscope apparatus, which is performed by a processor of the microscope apparatus, the method comprising:
providing a light source unit configured to emit light onto a subject and including a light emitting element array with multiple light emitting elements;

simultaneously or sequentially emitting light onto the subject multiple times using at least one of a first light emitting element and a second light emitting element, which is symmetrical to the first light emitting element about one axis, among the multiple light emitting elements, while changing a position of the light source unit in one direction;
forming, using an optical unit disposed in parallel with the subject, an enlarged image of the subject;
acquiring a plurality of enlarged images of the subject in accordance with the change in position of the light source unit by capturing the plurality of enlarged images using an image sensor;
calculating a plurality of light intensity sums for the plurality of enlarged images, respectively;
checking for a position error of the light source unit based on the plurality of light intensity sums; and
correcting the position of the light source unit based on the position error.

12. The method of claim 11, further comprising:
after the correcting of the position of the light source unit:
emitting light onto the subject using the light source unit, and
using the image sensor, acquiring the enlarged image of the subject.

13. The method of claim 11, wherein the one direction includes one of:
an arrangement direction in which the multiple light emitting elements are arranged;
a direction perpendicular to the arrangement direction; and
a direction which is inclined at a predetermined angle with respect to the arrangement direction.

14. The method of claim 11, wherein the one axis includes a line which traverses an optical axis among lines that are parallel to the one direction and perpendicular to an optical axis of the optical unit.

15. The method of claim 11, wherein the first light emitting element and the second light emitting element have different color values or a same color value and are included in a predetermined region of the light emitting element array which corresponds to a light incident range in accordance with a numerical aperture of the light source unit.

16. The method of claim 11, wherein the checking for the position error includes:
creating graphs by displaying the plurality of light intensity sums in two-dimensional space in accordance with the change in position of the light source unit;
calculating one or more difference values between centers of mass of the created graphs; and
checking for the position error of the light source unit based on the one or more difference values.

17. The method of claim 16, wherein the correcting of the position of the light source unit includes moving the light source unit so that the centers of mass of the graphs coincide.

18. The method of claim 11, wherein Fourier ptychography is used to acquire the enlarged image of the subject.

19. The method of claim 11, wherein:
emitting of multiple lights onto the subject by the multiple light emitting element includes allowing the first light emitting element to emit light;
the checking for the position error of the light source unit based on the plurality of light intensity sums includes:
calculating first light intensity sums for first enlarged images acquired for the first light emitting element; and creating a first type graph by displaying the first light intensity sums in two-dimensional space in accordance with the change in position of the light source unit corresponding to the first enlarged images;

the emitting of the multiple lights onto the subject further includes allowing the second light emitting element to emit light; and the checking for the position error of the light source unit based on the plurality of light intensity sums further includes:

calculating second light intensity sums for second enlarged images acquired for the second light emitting element;

creating a second type graph by displaying the second light intensity sums in two-dimensional space in accordance with the change in position of the light source unit corresponding to the second enlarged images;

calculating one or more difference values between centers of mass of the first type graph and the second type graph; and checking for the position error of the light source unit based on the one or more difference values.

20. The method of claim 11, wherein:

emitting of the multiple lights onto the subject by the multiple light emitting elements includes a first step of allowing the first light emitting element and the second light emitting element to emit light while changing position of the light source unit in the one direction by a predetermined distance; and the first step is repeatedly performed: and the checking for the position error of the light source unit based on the plurality of light intensity sums includes:

calculating first light intensity sums for the plurality of enlarged images corresponding to the first light emitting element and a second light intensity sums for the plurality of enlarged images corresponding to the second light emitting element;

creating a first type graph by displaying the first light intensity sums in two-dimensional space in accordance with the change in position of the light source unit for the plurality of enlarged images corresponding to the first light emitting element;

creating a second type graph by displaying the second light intensity sums in two-dimensional space in accordance with the change in position of the light source unit for the plurality of enlarged images corresponding to the second light emitting element;

calculating one or more difference values between centers of mass of the first type graph and the second type graph; and checking for a rotation error of the light source unit based on the one or more difference values.

* * * * *